May 3, 1966  R. B. WOODWARD  3,249,643
TRICYCLO[5.2.1.0⁴,¹⁰]-2,5,8-DECATRIENE
Filed Jan. 7, 1964

I

II

III

IV

V

VI

|  | $R_1$ | $R_2$ |
|---|---|---|
| VII | —H | —H |
| VIII | —CH$_3$ | —H |
| IX | —CH$_3$ | —CH$_3$ |

| R |  |
|---|---|
| X | —OCH$_3$ |
| XII | —OH |
| XIV | —Cl |

|  | $R_1$ | $R_2$ |
|---|---|---|
| XI | —OCH$_3$ | —OCH$_3$ |
| XIII | —OH | —OH |
| XV | —Cl | —Cl |

XXVI

| R |  |
|---|---|
| XVI | —N=C=O |
| XVIII | —NHCOOCH$_3$ |
| XX | —NH$_2$ |
| XXII | —N(CH$_3$)$_2$ |
| XXIV | —N⁺(CH$_3$)$_2$–O⁻ |

| R |  |
|---|---|
| XVII | —N=C=O |
| XIX | —NHCOOCH$_3$ |
| XXI | —NH$_2$ |
| XXIII | —N(CH$_3$)$_2$ |
| XXV | —N⁺(CH$_3$)$_2$–O⁻ |

INVENTOR
ROBERT B. WOODWARD

BY  *C. Harold Herr*
ATTORNEY

United States Patent Office 3,249,643
Patented May 3, 1966

3,249,643
TRICYCLO [5.2.1.0^{4,10}]-2,5,8-DECATRIENE
Robert B. Woodward, Boston, Mass.
Filed Jan. 7, 1964, Ser. No. 336,212
1 Claim. (Cl. 260—666)

The present invention relates to a novel unsaturated polycyclic hydrocarbon.

Figure 1:
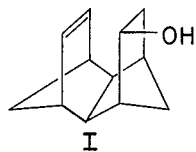
Figure 2:
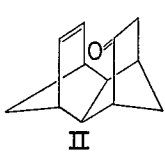
Figure 3:
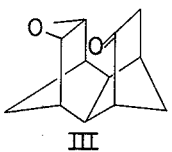
Figure 4:
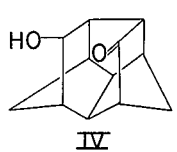
Figure 5:
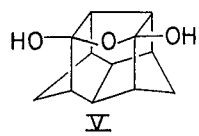
Figure 6:
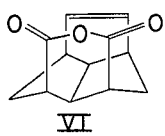
Figure 7:
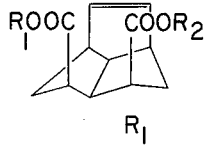
Figure 8:
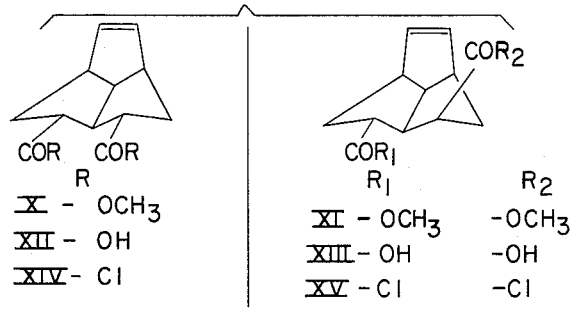
Figure 10:
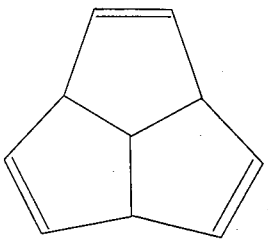
Figure 9:
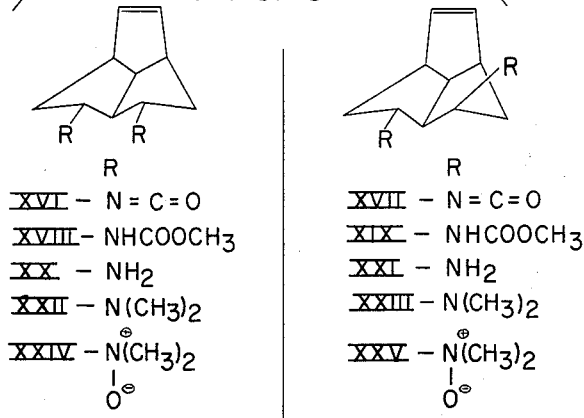

The new compound of this invention is tricyclo-[5.2.1.0^{4,10}]-2,5,8-decatriene. It is a waxy, colorless solid which melts to a colorless oil at 20° C. It is represented structurally by Formula XXVI of the accompanying FIGURE 10.

In the FIGURES 1–9, Formulas I–XXV, inclusive, illustrate structurally the several compounds involved in the preparation of tricyclo[5.2.1.0^{4,10}]-2,5,8-decatriene. The preparation of these intermediates and the final product are shown in detail in the example which follows. Roman numerals refer to the corresponding formulas in the accompanying drawing.

Tricyclo[5.2.1.0^{4,10}]-2,5,8-decatriene is a strong absorber of ultraviolet light at wave lengths below 200$\mu$. It is accordingly useful as a screener for light in this wave length range. For example, a thin layer of the tricyclo-decatriene between glass plates in a closed cell structure makes a convenient UV screen of this type.

*Example*

Part A.—A solution of 5.28 g. of ca. 70% pure alcohol I (P. Bruck, D. Thompson, and S. Winstein, Chem. & Ind., 1960, 405) in 60 ml. of pyridine is added with stirring to a suspension of chromium trioxide-pyridine complex prepared from 9.0 g. of chromium trioxide and 90 ml. of pyridine. The resulting dark brown mixture is stirred for 15 minutes at 25° C., allowed to stand overnight, poured in 600 g. of crushed ice and extracted with two 500 ml. portions of pentane. The pentane extracts from six identical runs are combined and washed successively with water, 2 N sulfuric acid and saturated sodium chloride solution. After drying over anhydrous sodium sulfate the solvent is evaporated to give 27.1 g. of ketone II as almost colorless powder.

Part B.—Ketone II (27.1 g.) is dissolved in 400 ml. of benzene and mixed with 400 ml. of 0.425 N perbenzoic acid solution in benzene. The mixture is allower to stand at 25° C. for 10 hours, while 68% of the perbenzoic acid is consumed. The pale yellow solution is thoroughly mxed with a potassium iodide solution prepared from 80 g. of potassium iodide, 20 ml. of acetic acid, and 800 ml. of ice-water. The aqueous layer is separated and extracted with benzene. The combined benzene solutions are washed successively with 1 N sodium thiosulfate, 1 N sodium bicarbonate solution and saturated sodium chloride solution and dried over anhydrous magnesium sulfate. The solvent is evaporated and the pale yellow semi-solid residue is dissolved in hexane-benzene (ca. 10:1) and kept at 0° C. for several hours to give 17.4 g. of epoxy-ketone III in the form of needles, M.P. 171–174° C. After three recrystallizations from hexane epoxyketone III melts at 172–174° C. with a preliminary change to a waxy mass at 100° C.

IR ($\mu$) in CCl$_4$: 5.72, 11.7

Analysis.—Calcd. for C$_{12}$H$_{14}$O$_2$: C, 75.76; H, 7.42. Found: C, 75.83; H, 7.47.

Part C.—To a potassium t-butoxide solution prepared from 5.3 g. of potassium and 350 ml. of t-butyl alcohol under nitrogen is added 16.5 g. of epoxyketone III in 80 ml. of benzene over a period of 15 minutes. The mixture is stirred at 25° C. under nitrogen for 1.5 hours and poured in 1.5 kg. of ice-water. The aqueous layer is separated and extracted with three 500 ml. portions of ether. The combined organic solutions are washed with saturated sodium chloride solution twice and dried over anhydrous magnesium sulfate. The solvent is evaporated under reduced pressure and the crystalline residue is recrystallized from benzene-hexane to give 12.6 and 2.3 g. of ketoalcohol IV in the form of colorless crystals as the first and second crop, respectively, M.P. 197–201° C.

IR:
In CCl$_4$—2.85$\mu$, 5.73$\mu$.
In mineral oil—2.89$\mu$, 5.83$\mu$.

Analysis.—Calcd. for C$_{12}$H$_{14}$O$_2$: C, 75.76; H, 7.42. Found: C, 75.78; H, 7.43.

Part D.—To a well-stirred solution of 12.10 g. of keto-alcohol IV in 2000 ml. of ether is added 100 ml. of 2 N chromic acid solution at 25° C. dropwise over a period of 1.5 hours. The brown cloudy mixture is stirred at 25° C. for 4.5 hours, while the mixture separates into a greenish aqueous solution and a pale yellow ethereal solution. The aqueous solution is separated and extracted with ethyl acetate three times. The combined organic solutions are washed with saturated sodium chloride solution until the washing becomes colorless. The organic solution is dried over anhydrous magnesium sulfate and concentrated to ca. 300 ml. and cooled at −40° C. to give 6.87 g. of needles. The mother liquor is further concentrated to give 1.73 g. of prisms. The second mother liquor is concentrated and stirred with 2 N sulfuric acid at 25° C. for six hours, while voluminous needles precipitate. The needles are filtered, washed with water and ether, and weigh 1.06 g. The product is polymorphic, and sublimes or crystallizes from ethyl acetate into prisms and from water and ether into needles. The two forms are different in the IR but interconvertible. The combined yield of diketone hydrate V is 9.66 g. After three recrystallizations from ethyl acetate, diketone hydrate V melts at 215–217° C. with a preliminary change to a waxy mass at 203–205° C.

Analysis.—Calcd. for C$_{12}$H$_{14}$O$_3$: C, 69.88; H, 6.84. Found: C, 69.98; H, 6.91.

Part E.—A mixture of 10.31 g. of diketone hydrate V, 27.0 g. of lead tetraacetate (92% pure by titration), and 2000 ml. of dry benzene is refluxed with stirring and exclusion of moisture. The originally pale yellow reaction mixture becomes dark red brown within 10 minutes, gradually orange yellow and finally almost colorless after four hours. To the cooled mixture is added saturated sodium chloride solution and the pale yellow precipitate is filtered. The filtrate is separated and the aqueous layer extracted with ethyl acetate. The combined organic solutions are washed with 1 N sodium bicarbonate twice and saturated sodium chloride solution, and dried over anhydrous magnesium sulfate. The solvents are evaporated and the pale brown oily residue, which solidifies at room temperature, is recrystallized from benzene (in an ice box overnight) to give 2.70 g. of anhydride VI. After two recrystallizations from benzene anhydride VI melts at 141–143° C. with a preliminary change to a waxy mass at 130° C.

Analysis.—Calcd. for C$_{12}$H$_{12}$O$_3$: C, 70.57; H, 5.92. Found: C, 70.68; H, 5.98.

Part F.—The mother liquor from the recrystallization of anhydride VI is evaporated and the residue stirred with 0.1 N sodium hydroxide solution for 10 minutes to give a clear yellow solution. The stirring is continued for another five minutes. The solution is washed with ethyl acetate, strongly acidified with concentrated sulfuric acid at about 0° C., and kept cold for two hours. The colorless prisms are collected by filtration and washed with water, ethyl acetate, and ether to yield 1.57 g. of endo-diacid VII. After two recrystallizations from methanol-ethyl acetate and one from methanol, endo-diacid VII melts at 205–206° C.

*Analysis.*—Calcd. for $C_{12}H_{14}O_4$: C, 64.85; H, 6.35. Found: C, 64.82; H, 6.44.

*Part G.*—A solution of 1.64 g. of anhydride VI in 50 ml. of methanol is refluxed for five hours and evaporated to dryness to give colorless crystalline endo-monomethyl ester VIII in a quantitative yield. After recrystallization from methanol, the ester melts at 140–143° C., IR 5.79, 5.87µ in mineral oil and also in chloroform. The crude monoester is suspended in ether and an excess of ethereal diazomethane is added. The yellow solution is stirred at 25° C. for 10 minutes and evaporated under reduced pressure. The almost colorless oily residue is redissolved in ether and kept at about −20° C. to separate a small amount of fluffy colorless solid. The filtrate is evaporated to give 1.93 g. of oily endo-dimethyl ester IX, IR 5.75µ in mineral oil, 5.75 in carbon disulfide, and 5.79 in chloroform.

*Part H.*—To a cold, well-stirred suspension of 1.27 g. of endo-diacid VII in 10 ml. of water and 2.6 ml. of 2 N sulfuric acid is added an ethereal diazomethane solution until a faint yellow color persists for several minutes. After stirring for 10 more minutes at 25° C. the aqueous layer is separated and extracted with ether. The combined ether extracts are dried over anhydrous magnesium sulfate and the solvent is evaporated to give 1.41 g. of endo-dimethyl ester IX as an almost colorless oil.

*Part I.*—To a sodium methoxide solution prepared from 5.5 g. of sodium and 120 ml. of freshly dried and distilled (over magnesium) methanol is added 14.6 g. of endo-dimethyl ester IX in 20 ml. of the dried methanol. The solution is stirred at reflux under nitrogen and with careful exclusion of moisture for one hour. To the cooled solution is added 15 ml. of acetic acid dropwise at 0° C. and the solution is evaporated under reduced pressure. The oily residue is diluted with water and extracted with ether three times. The combined ether extracts are washed successively with 1 N sodium bicarbonate twice, water, and saturated sodium chloride solution and dried over anhydrous magnesium sulfate. The solvent is evaporated to give a mixture of 72% exo- and 28% endo-exo-dimethyl esters X and XI as a pale yellow oil.

*Part J.*—The oily mixture of X and XI is dissolved in 100 ml. of 20% methanolic potassium hydroxide solution and heated at 40° C. under nitrogen for two hours, during which time a crystalline precipitate forms. The solvent is evaporated under reduced pressure to dryness and the residue is redissolved in ice water and washed with ether. The aqueous solution is strongly acidified with concentrated sulfuric acid at 0° C. and the precipitated crystals are collected by filtration, washed with water, and dried in vacuo to yield 11.25 g. of a mixture of 72% exo- and 28% endo-exo-diacids XII and XIII melting at 166–205° C. (mainly at 166–172° C.).

*Part K.*—A 72:28 mixture of diacids XII and XIII (2.22 g.) is refluxed with 15 ml. of thionyl chloride for one hour and the excess thionyl chloride is evaporated under reduced pressure and finally by codistillation with toluene to give a mixture of diacid chlorides XIV and XV as an almost colorless oil. IR: 5.5µ in carbon disulfide.

*Part L.*—The diacid chloride mixture is dissolved in 20 ml. of dry toluene and heated, with stirring at reflux from 140° C. bath, with 4.0 g. of fresh hydrazine-activated sodium azide for five hours, while 570 ml. of nitrogen is evolved and the gas evolution ceases completely. The cooled mixture is filtered and the inorganic salts are washed with toluene, thus giving rise to a toluene solution of diisocyanates XVI and XVII. Evaporation of the solvent from an aliquot of the solution gives a mixture of XVI and XVII as a colorless oil. IR: 4.40µ in carbon disulfide.

*Part M.*—To the toluene solution of XVI and XVII is added 20 ml. of methanol and the solution is refluxed for two hours. The solvent is evaporated under reduced pressure to give 2.69 g. of a mixture of exo- and endo-exo-diurethanes XVIII and XIX as colorless crystals. IR: 5.82µ in chloroform. Recrystallization from benzene gives 2.1 g. of exo-diurethane XVIII in the form of needles, M.P. 170–172° C. sintering at 145° C. Evaporation of the mother liquor and recrystallization of the solid residue from benzene-pentane gives 0.18 g. of endo-exo-diurethane XIX in the form of needles, M.P. 145–148° C.; IR: 5.83µ in chloroform. The higher melting compound is purified by recrystallization from benzene-ligroin, sublimation at 150° C. at 0.05 mm. and another recrystallization from benzene to obtain exo-diurethane XVIII, M.P. 177.5–178.5° C.

KR: 5.81µ in chloroform.

*Analysis.*—Calcd. for $C_{14}H_{20}N_2O_4$: C, 59.98; H, 7.19; N, 9.99. Found: C, 59.94; H, 7.29; N, 10.11.

*Part N.*—A solution of 2.85 g. of a mixture of exo- and exo-endo-diurethanes XVIII and XIX in 35 ml. of 32% methanolic potassium hydroxide is heated at reflux under nitrogen. Within 30 minutes colorless fine needles start to precipitate. The reflux is continued with stirring for seven hours and the methanol is evaporated under reduced pressure to give an almost colorless semisolid residue containing potassium salts of dicarbamic acids. The residue is dissolved in water and strongly acidified with concentrated hydrochloric acid at about 0° C. At pH 6–7 a smooth decarboxylation sets in. The acidic solution is washed with ether and made strongly basic by adding potassium hydroxide pellets. This solution is saturated with potassium chloride and continuously extracted with ether under nitrogen (exclusion of carbon dioxide) for 18 hours. The cloudy ether extract is evaporated under nitrogen, during which time the solution separates into two phases. The evaporation is stopped when the mixture again becomes homogeneous. There is obtained 5.6 g. of a mixture of diamines XX and XXI in the form of a pale yellow homogeneous oil.

*Part O.*—The crude mixture (5.6 g.) of diamines XX and XXI is cooled to about 0° C. and slowly mixed with 17 ml. of 87% formic acid. The reaction is exothermic. The resulting solution is refluxed with 13 ml. of 37% formaldehyde for 20 hours. To the cooled, pale brown solution is added 15 ml. of 2 N hydrochloric acid and the solution is washed with ether three times. The aqueous solution is evaporated under reduced pressure to a heavy vicous oil, which is redissolved in water, made strongly basic with potassium hydroxide pellets and extracted with ether three times. The combined ether extracts are dried over anhydrous magnesium sulfate and the solvent is evaporated to give 1.8 g. of a light brown oil. Distillation of the oil affords 1.68 g. of a mixture of bis(dimethylamino) compounds XXII and XXIII as a colorless oil, B.P. 114–116° C. at 1.5 mm. It is purified by redistillation, B.P. 101.5° C. at 0.9 mm.

*Part P.*—To a solution of 2.75 g. of a mixture of bis-(dimethylamino) derivatives XXII and XXIII in 8.0 ml. of methanol is added 8.0 ml. of 30% hydrogen peroxide with stirring at 0° C. The solution is slowly warmed up to 25° C. and allowed to stand for 20 hours. The excess hydrogen peroxide is decomposed with a small amount of freshly prepared platinum black with stirring at 0° C. After the suspension becomes peroxide-free to an iodide starch test paper, the catalyst is filtered and washed with methanol. The filtrate containing amine oxides XXIV and XXV is concentrated under reduced pressure at 35° C. (not higher) to a heavy colorless oil. The oil is transferred with the aid of a minimum amount of methanol into a 20 ml. round-bottom flask containing a magnetic stirring bar and the methanol is evaporated. The flask is then connected through a short distillation head to two traps in series; the first cooled at 0° C. and the second at −78° C. The pressure is reduced to 45 mm. and the compounds are heated slowly by means of a stirred oil bath. The pyrolysis starts at ca. 70° C. to distill off colorless liquid and the remainder becomes darker and considerably less viscous. The bath temperature is raised ca. 1° C. per minute. When the pressure is lowered to 35 mm. and the temperature reaches 90° C., the oil in the flask starts to diminish considerably, and at 100° C. the remainder solidifies. By this time a substantial amount of material has accumulated in the first trap. At 125° C. the solid in the flask starts to melt and a smooth vigorous decomposition sets in. After the vigorous decomposition ceases, the pressure is lowered to 20 mm. and the temperature raised to 160° C. The pyrolysis is completed within 1.5 hours and a very small amount of black residue remains in the flask. The distilling head is intermittently heated with a free frame during the reaction. The pyrolysate in the first trap consists of two layers, the upper layer being a clear colorless liquid and insoluble in pentane, and the cloudy lower layer containing cube-shaped crystals and being soluble in pentane. The second trap contains little substance. The product is washed out with distilled pentane into a separatory funnel and cold 2 N hydrochloric acid is added until the aqeous layer is pH 2. The aqueous layer is separated after thorough shaking and re-extracted once with pentane. The combined pentane solutions are washed with 1 N sodium bicarbonate, water and saturated sodium chloride solution and dried over anhydrous magnesium sulfate. The pentane is carefully distilled through a 25 cm. glass helix-packed column. The residual pale yellow oil is distilled through a 25 cm. unpacked column to give 1.105 g. of tricyclo-[5.2.1.0$^{4,10}$]-2,5,9-tridecatriene XXVI as a colorless oil, B.P. 80° C. at 30 mm., which crystallizes into cubes in an ice-bath. The column is washed with the recovered pentane and the washing is combined with the distillation residue and redistilled through a short distillation head to give 373 mg. of triene XXVI as a colorless oil, B.P. 75° C. at 25 mm. It is purified by vapor phase chromatography (2 m. column C, silicone oil; column temperature 96° C.; helium flow rate 56 cc./min.). The purified triene shows no change after heating in a steam bath in a sealed tube under nitrogen for three days. Its properties are:

Melting point: 20° C.

Infrared spectrum: neat
3.30 m, 3.40 w, 3.50 m, 6.22 w, 7.43 m, 10.27 s, 11.55 s, 12.26 s, 13.30–13.41 s–br, 14.28 s, $\mu$.

Mass spectrum: parent ion peak, 130 m/e.

n-m-r spectrum: in CDCl$_3$
    6.23$\tau$ singlet 4 protons
    4.32$\tau$ singlet 6 protons Far-ultraviolet spectrum: in isooctane
    $\lambda_{max.}$ 187m$\mu$ $\epsilon$ 13,000
    Shoulder 204 m$\mu$ $\epsilon$ 5,000

As many apparently widely different embodiments of this invention may be made without departing from the spirit and scope thereof, it is to be understood that this invention is not limited to the specific embodiments thereof except as defined in the appended claim.

The embodiment of the invention in which an exclusive property or privilege is claimed is defined as follows:

Tricyclo[5.2.1.0$^{4,10}$]-2,5,8-decatriene.

References Cited by the Examiner

F. M. Muller, Chem. Weekblad, 59, 334–7 (June 1963).

DELBERT E. GANTZ, *Primary Examiner.*

V. O'KEEFE, *Assistant Examiner.*